Patented May 24, 1938

2,118,074

UNITED STATES PATENT OFFICE 2,118,074

MANUFACTURE OF CELLULOSE

Henry Dreyfus, London, England

No Drawing. Application June 23, 1936, Serial No. 86,819. In Great Britain July 10, 1935

12 Claims. (Cl. 92—11)

This invention relates to the manufacture of cellulose from lignocellulosic materials such as wood, straw, grass and the like.

It is well known that cellulose produced from wood by the so-called sulphite, sulphate and soda processes, while satisfactory for use in the manufacture of paper and for many other purposes, is not suitable as a raw material in the manufacture of esters and ethers of cellulose, such for example as cellulose acetate. This is partly due to the fact that these processes either give rise to a more or less impure cellulose which still contains considerable quantities of lignin and pentosans or, if the purification process is carried further, the cellulose itself is attacked to an undue extent with the formation of degraded forms of cellulose. In either event the pulp obtained contains a relatively low percentage of $\alpha$-cellulose, whereas for the manufacture of cellulose acetate and the like it is important that the $\alpha$-cellulose content of the raw material be high.

I have now found that a cellulose having a high $\alpha$-cellulose content may be obtained by subjecting lignocellulosic materials to treatment with a bisulphite solution at a temperature between 90° and 120° C. under a pressure higher than the vapour pressure of the liquor followed by a treatment with dilute alkali at a temperature between 90° and 130° C. also under a pressure higher than the vapour pressure of the liquor.

The bisulphite treatment may be carried out with sulphite liquors such as are employed in the various known processes such as the Mitscherlich process, the Ritter/Kellner process and the Quick Cook process. In general however it is preferred to employ liquors containing a relatively small proportion of free sulphur dioxide over and above that which is present combined with alkali in the form of bisulphite; for example the liquor may contain at least 1.5 times and preferably at least twice as much combined as free sulphur dioxide.

As already indicated, the bisulphite treatment is effected at a relatively low temperature of about 90°–120° C. Thus for example temperatures between 95° C. and 110° C., and especially temperatures in the neighbourhood of 100° C. may be employed with advantage. The pressure under which the treatment is carried out may exceed the vapour pressure of the bisulphite solution, (or atmospheric pressure when the bisulphite solution is employed at a temperature below its boiling point) by, for example, 2, 5, 10, 20, 50 atmospheres or more. The excess pressure may be produced by means of compressed nitrogen or other gas or vapour which exercises no chemical effect on the reaction; or by means of relatively small quantities of a volatile organic liquid, such for example as diethyl ether, or by any other suitable means.

Owing to the mildness of the conditions employed it is advisable to subject the lignocellulosic materials to treatment with the bisulphite solution for a relatively long time; for example the treatment may last for more than 40 or 50 hours, e. g. from 80–120 hours. Generally speaking less resistant materials may be treated for a shorter time than more resistant woods such as spruce wood, other conditions being equal.

The alkali treatment may with advantage be carried out with a solution of caustic soda of concentration between 0.5 and 2% or with a solution of equivalent alkalinity, preferably at a temperature between 100° and 120° C. The pressure employed may, as in the bisulphite treatment, exceed the vapour pressure of the liquor (or atmospheric pressure when the liquor is employed at a temperature below its boiling point) by, for example, 2, 5, 10, 20 or 50 atmospheres or more. In general a reaction period of, for example, 5, 10 or 20 hours will prove sufficient. Instead of or as well as caustic soda other alkiline substances such for example as sodium sulphide may be employed.

If desired the alkali treatment of the invention may itself be followed by a further treatment, for example with cold, more concentrated alkali, such as a 12–20% solution of caustic soda. Whether or not this second alkali treatment is applied, the materials may be subjected to a bleaching treatment, for example with chlorine or sodium or calcium hypochlorite.

The treatment of the invention may if desired be preceded by a resin extracting step. For example the cellulosic material may be heated with a very dilute alkali at, for example, 40° or 50° C. or may be extracted with an organic solvent such as benzol or treated with steam or water under pressure. Such treatment may be of special advantage when woods which are rich in resin, such as pine chips, are being treated.

The cellulose prepared by the present process may be utilized for any desired purpose, for example for the manufacture of regenerated cellulose products by the viscose or other processes, and for the manufacture of paper or other products comprising fibrous cellulose. It is however of especial value in the manufacture of cellulose derivatives.

Before being employed in the manufacture of organic esters of cellulose with the aid of organic acid anhydrides the cellulose is preferably subjected to a pretreatment with an acid, and particularly a lower fatty acid, for example formic acid or acetic acid. Such acids may be applied in small or large quantities and in liquid or vapour form. Similarly, pretreatments with mineral acids, for example hydrochloric acid or sulphuric acid, may be applied, preferably in conjunction with acetic acid or other lower fatty acid; such pretreatments are preferably carried out under conditions of temperature, concentration and quantity of mineral acid, which do not lead to substantial degradation of the cellulose. A pretreatment with a lower fatty acid, for example acetic acid, may be applied in such a way as to introduce into the cellulose the catalyst required for the subsequent acetylation or other esterification. If desired, any mineral acid used during the pretreatment may be neutralized or substantially neutralized before applying the esterifying agent. For further details as to the pretreatments reference is made to French Patent No. 565,654 and U. S. Patents Nos. 1,831,101 and 1,911,069.

For the manufacture of good quality cellulose ethers and for the manufacture of viscose and other cellulose derivatives in which alkali is present during the conversion to the cellulose derivative, pretreatments with mineral and/or organic acids are in general unnecessary and the cellulose may be subjected directly to the treatment for conversion into the desired cellulose derivative. Similarly, in making nitrocellulose the nitrating acid may be appled directly to the purified cellulose prepared in accordance with the present invention.

Derivatives of cellulose made from cellulose produced according to the invention may be employed in the manufacture of artificial filaments, yarns, films, foils and other articles, and of lacquers, veneers, moulding powders and other compositions.

The following example illustrates without in any way limiting the invention:—

*Example*

Poplar chips are heated with a bisulphite liquor, containing about 2.5% combined sulphur dioxide and .7% free sulphur dioxide, to 100° C. under a pressure of 20 atmospheres for a period of 90–100 hours. The acid liquor is then blown off, and the solid residue is washed and then heated under a pressure of 20 atmospheres as before, with a 1% caustic soda solution at 120° C. for about 10 hours. The product so obtained may be bleached or may, if desired before being bleached, be treated in the cold with a 15–18% caustic soda solution.

Having described my invention, what I desire to secure by Letters Patent is:—

1. Process for the manufacture of cellulose which comprises subjecting unpulped lignocellulosic materials to treatment with a bisulphite solution, containing at most 66 parts of free sulphur dioxide for every 100 parts of combined sulphur dioxide, at a temperature between 90° and 120° C. and under a pressure which exceeds the vapor pressure of the liquor at the temperature employed by at least two atmospheres, followed by a treatment with dilute alkali at a temperature between 90° and 130° C. and under a pressure which exceeds the vapor pressure of the liquor at the temperature employed by at least two atmospheres.

2. Process for the manufacture of cellulose, which comprises subjecting unpulped lignocellulosic materials to treatment with a bisulphite solution containing at most 66 parts of free sulphur dioxide for exery 100 parts of combined sulphur dioxide at a temperature between 90° and 120° C. and under a pressure which exceeds the vapor pressure of the liquor at the temperature employed by at least 10 atmospheres, followed by a treatment with dilute alkali at a temperature between 90° and 130° C. and under a pressure which exceeds the vapor pressure of the liquor at the temperature employed by at least 2 atmospheres.

3. Process for the manufacture of cellulose, which comprises subjecting unpulped lignocellulosic materials to treatment with a bisulphite solution containing at most 66 parts of free sulphur dioxide for every 100 parts of combined sulphur dioxide at a temperature between 90° and 120° C. and under a pressure which exceeds the vapor pressure of the liquor at the temperature employed by at least 10 atmospheres, followed by a treatment with dilute alkali at a temperature between 90° and 130° C. and under a pressure which exceeds the vapor pressure of the liquor at the temperature employed by at least 10 atmospheres.

4. Process for the manufacture of cellulose which comprises subjecting unpulped lignocellulosic materials to treatment with a bisulphite solution, containing at most 50 parts of free sulphur dioxide for every 100 parts of combined sulphur dioxide, at a temperature between 90° and 120° C. and under a pressure which exceeds the vapor pressure of the liquor at the temperature employed by at least two atmospheres, followed by a treatment with dilute alkali at a temperature between 90° and 130° C. and under a pressure which exceeds the vapor pressure of the liquor at the temperature employed by at least two atmospheres.

5. Process for the manufacture of cellulose which comprises subjecting unpulped lignocellulosic materials to treatment for 80–120 hours with a bisulphite solution, containing at most 66 parts of free sulphur dioxide for every 100 parts of combined sulphur dioxide, at a temperature between 90° and 120° C. and under a pressure which exceeds the vapor pressure of the liquor at the temperature employed by at least two atmospheres, followed by a treatment with dilute alkali at a temperature between 90° and 130° C. and under a pressure which exceeds the vapor pressure of the liquor at the temperature employed by at least two atmospheres.

6. Process for the manufacture of cellulose which comprises subjecting unpulped lignocellulosic materials to treatment for 80–120 hours with a bisulphite solution, containing at most 50 parts of free sulphur dioxide for every 100 parts of combined sulphur dioxide, at a temperature between 90° and 120° C. and under a pressure which exceeds the vapor pressure of the liquor at the temperature employed by at least two atmospheres, followed by a treatment with dilute alkali at a temperature between 90° and 130° C. and under a pressure which exceeds the vapor pressure of the liquor at the temperature employed by at least two atmospheres.

7. Process for the manufacture of cellulose which comprises subjecting unpulped lignocellulosic materials to treatment with a bisulphite solution, containing at most 66 parts of free sulphur dioxide for every 100 parts of combined sulphur dioxide, at a temperature between 90° and 120° C. and under a pressure which exceeds the vapor pressure of the liquor at the temperature employed by at least two atmospheres, followed by a treatment with ½–2% caustic soda solution at a temperature of 100–120° C. and under a pressure which exceeds the vapor pressure of the liquor at the temperature employed by at least two atmospheres.

8. Process for the manufacture of cellulose which comprises subjecting unpulped lignocellulosic materials to treatment with a bisulphite solution, containing at most 50 parts of free sulphur dioxide for every 100 parts of combined sulphur dioxide, at a temperature between 90 and 120° C. and under a pressure which exceeds the vapor pressure of the liquid at the temperature employed by at least two atmospheres, followed by a treatment with ½–2% caustic soda solution at a temperature of 100–120° C. and under a pressure which exceeds the vapor pressure of the liquor at the temperature employed by at least two atmospheres.

9. Process for the manufacture of cellulose which comprises subjecting unpulped lignocellulosic materials to treatment for 80–120 hours with a bisulphite solution, containing at most 50 parts of free sulphur dioxide for every 100 parts of combined sulphur dioxide, at a temperature between 90° and 120° C. and under a pressure which exceeds the vapor pressure of the liquor at the temperature employed by at least two atmospheres, followed by a treatment with ½–2% caustic soda solution at a temperature of 100–120° C. and under a pressure which exceeds the vapor pressure of the liquor at the temperature employed by at least two atmospheres.

10. Process for the manufacture of cellulose which comprises subjecting unpulped lignocellulosic materials to treatment with a bisulphite solution containing at most 66 parts of free sulphur dioxide for every 100 parts of combined sulphur dioxide, at a temperature between 90° and 120° C. and under a pressure which exceeds the vapor pressure of the liquor at the temperature employed by at least two atmospheres, followed first by a treatment with dilute alkali at a temperature between 90° and 130° C. and under a pressure which exceeds the vapor pressure of the liquor at the temperature employed by at least two atmospheres, and then by a treatment in the cold with 12–20% caustic soda solution.

11. Process for the manufacture of cellulose which comprises subjecting unpulped lignocellulosic material to treatment with a bisulphite solution, containing at most 50 parts of free sulphur dioxide for every 100 parts of combined sulphur dioxide, at a temperature between 90° and 120° C. and under a pressure which exceeds the vapor pressure of the liquor at the temperature employed by at least two atmospheres, followed first by a treatment with dilute alkali at a temperature between 90° and 130° C. and under a pressure which exceeds the vapor pressure of the liquor at the temperature employed by at least two atmospheres, and then by a treatment in the cold with 12–20% caustic soda solution.

12. Process for the manufacture of cellulose which comprises subjecting unpulped lignocellulosic materials to treatment with a bisulphite solution, containing at most 66 parts of free sulphur dioxide for every 100 parts of combined sulphur dioxide, at a temperature between 90° and 120° C. and under a pressure which exceeds the vapor pressure of the liquor at the temperature employed by at least two atmospheres, followed first by a treatment with ½–2% caustic soda solution at a temperature of 100–120° C. and under a pressure which exceeds the vapor pressure of the liquor at the temperature employed by at least two atmospheres, and then by a treatment in the cold with 12–20% caustic soda solution.

HENRY DREYFUS.